(12) United States Patent
Kohlhauser et al.

(10) Patent No.: US 9,050,874 B2
(45) Date of Patent: Jun. 9, 2015

(54) SPRING DAMPER UNIT

(75) Inventors: Matthias Kohlhauser, Graz (AT); Hansjörg Pöhler, Grambach (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/520,599

(22) PCT Filed: Dec. 21, 2010

(86) PCT No.: PCT/EP2010/070433
§ 371 (c)(1),
(2), (4) Date: Jul. 5, 2012

(87) PCT Pub. No.: WO2011/080163
PCT Pub. Date: Jul. 7, 2011

(65) Prior Publication Data
US 2013/0020748 A1   Jan. 24, 2013

(30) Foreign Application Priority Data
Jan. 4, 2010   (DE) .......................... 10 2010 003 986

(51) Int. Cl.
*B60G 15/06* (2006.01)
*B60G 17/015* (2006.01)
*B60G 17/02* (2006.01)

(52) U.S. Cl.
CPC .......... *B60G 15/063* (2013.01); *B60G 17/0157* (2013.01); *B60G 17/021* (2013.01); *B60G 2202/12* (2013.01); *B60G 2202/42* (2013.01); *B60G 2204/4191* (2013.01); *B60G 2500/30* (2013.01)

(58) Field of Classification Search
USPC .............. 267/218, 221, 225, 226; 280/5.514, 280/6.157, 6.159
See application file for complete search history.

(56) References Cited

U.S. PATENT DOCUMENTS

| 5,098,120 A * | 3/1992 | Hayashi et al. ............... 267/276 |
| 7,922,181 B2 * | 4/2011 | Hakui et al. ............... 280/6.157 |
| 7,976,030 B2 * | 7/2011 | Michel ...................... 280/6.157 |
| 8,262,100 B2 * | 9/2012 | Thomas ..................... 280/5.514 |
| 2007/0210539 A1 | 9/2007 | Hakui |

(Continued)

FOREIGN PATENT DOCUMENTS

| DE | 102 50 805 | 5/2004 |
| DE | 10250805 A1 | 5/2004 |

(Continued)

*Primary Examiner* — Thomas J Williams
(74) *Attorney, Agent, or Firm* — Jordan IP Law, LLC; Todd A. Vaughn

(57) ABSTRACT

A spring damper unit configured for arrangement between a first vehicle part and a second vehicle part of a motor vehicle. The spring damper unit includes a first fastening device for fastening the spring damper unit to the first vehicle part and a second fastening device for fastening the spring damper unit to the second vehicle part. In addition, the spring damper unit includes an elastic element and a vibration damper having two damper parts that move relatively with respect to each other and are arranged between the fastening devices in order to damp relative movements between the vehicle parts and to control a spaced disposition between the vehicle parts. The pre-stressing of the elastic elements are variably adjusted via a first adjusting device and one of the damper parts is adjustable relative to one of the fastening devices via a second adjusting device.

18 Claims, 4 Drawing Sheets

(56) References Cited

U.S. PATENT DOCUMENTS

2009/0108546 A1    4/2009  Ohletz
2009/0146385 A1*   6/2009  Michel .................. 280/5.514

FOREIGN PATENT DOCUMENTS

| JP | 2005 106106 | 4/2005 |
|---|---|---|
| JP | 2005106106 A | 4/2005 |
| WO | WO 2009/071149 | 6/2009 |

* cited by examiner

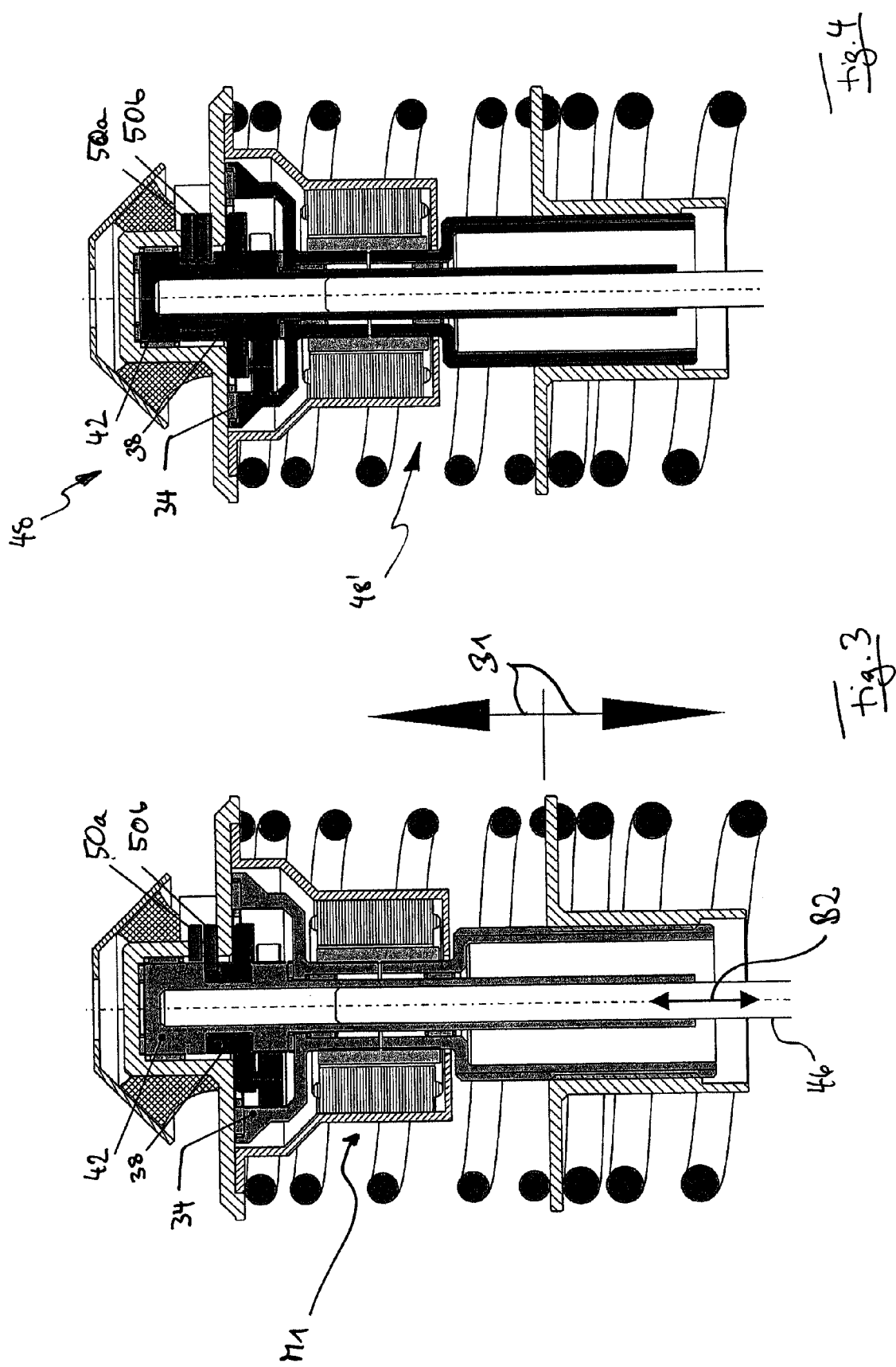

SPRING DAMPER UNIT

CROSS-REFERENCE TO RELATED APPLICATIONS

The present application is a National Stage Application of PCT International Application No. PCT/EP2010/070433 (filed on Dec. 21, 2010), under 35 U.S.C. §371, which claims priority to German Patent Publication No. 10 2010 003986 (filed on Jan. 4, 2010), which are each hereby incorporated by reference in their respective entireties.

FIELD OF THE INVENTION

The present invention relates to a spring damper unit to be arranged between a first vehicle part and a second vehicle part, in particular between a vehicle body and a wheel (i.e., an axle) of a motor vehicle.

BACKGROUND OF THE INVENTION

Spring damper units of the aforementioned type are used in automotive technology to damp relative movements between two vehicle parts and to control a spaced disposition between the vehicle parts. Modern spring damper units in motor vehicles render it possible to control the level to compensate for the load and to adjust the height of vehicles in order to be able to ensure the optimum ground clearance constantly even in the most varied of load states and the most varied road conditions. An adjusting device is usually provided for this purpose, which adjusting device operates between the spring damper unit and the vehicle body and/or the vehicle wheel. Alternatively, the adjusting device can operate inside the spring damper unit.

The two variants mentioned hereinabove, however, are encumbered with disadvantages that adversely affect the travel comfort. If the adjusting device operates between the spring damper unit and the vehicle body or the vehicle wheel, then, as the load compensation is performed, the stroke lengths of the extension stage and the compression stage of the damper component of the spring damper unit are reduced. If the adjusting device operates inside the spring damper unit, then, as a height adjustment is performed, one spring stroke is shortened at the expense of the other spring stroke. This effect then occurs, for example, if a vehicle is set to a higher level due to a poor road surface. During an extension movement, the damper component then impacts against its upper allocated stop earlier in comparison to a state where no height adjustment has been performed. Consequently, when travelling with an increased ground clearance, the travel comfort is noticeably impaired.

SUMMARY OF THE INVENTION

It is therefore the object of the invention to provide an improved spring damper unit of the type mentioned in the introduction, which spring damper unit renders it possible to adjust the spaced disposition between two vehicle parts in a most efficient manner possible and to damp the vibrations between the vehicle parts. In particular, a spring damper unit is to be produced that renders it possible to control the level of the vehicle and/or to adjust the ground clearance without the travel comfort being reduced as a consequence.

This object is achieved by virtue of a spring damper unit to be arranged between a first vehicle part and a second vehicle part, in particular between a vehicle body and a wheel of a motor vehicle, having a first fastening device for fastening the spring damper unit to the first vehicle part and having a second fastening device for fastening the spring damper unit to the second vehicle part, in addition having an elastic element, and having a vibration damper having two damper parts that can move relatively with respect to each other and are arranged between the fastening devices in order to damp relative movements between the vehicle parts and to control a spaced disposition between the vehicle parts, wherein it is possible to variably adjust the pre-stressing of the elastic elements by means of a first adjusting device, and wherein one of the damper parts can be adjusted relative to one of the fastening devices by means of a second adjusting device.

The spring damper unit comprises a first fastening device for fastening the unit to the first vehicle part and a second fastening device for fastening the unit to the second vehicle part. In addition, an elastic element and a vibration damper having two damper parts that can move relatively with respect to each other are provided. The damper parts and the elastic element are arranged—at least as far as the function is concerned—between the fastening devices. Although it is not necessary that they themselves are connected to the fastening devices, they must operate between the said fastening devices. A first adjusting device renders it possible to variably adjust the pre-stressing of the elastic element. This means, in particular, that the position of an engagement point of the elastic element (e.g. the position of a spring plate) can be adjusted relative to the position of one of the fastening devices by means of the first adjusting device. In addition, the position of one of the damper parts (of the vibration damper) can be adjusted relative to the position of one of the fastening devices (in particular of the same fastening device) by means of a second adjusting device.

In other words, the pre-stressing of the elastic element is adjusted accordingly by means of the first adjusting device in order, for example, to take into consideration any change in the load acting between the vehicle parts. With the aid of the second adjusting device, it is further possible, for example, to change a position of a piston of the damper unit in such a manner that the optimum stroke lengths of the extension stage and the compression stage of the damper unit are constantly available. By virtue of suitable cooperation of the two adjusting devices, it can be guaranteed that, even when simultaneously controlling the level and adjusting the height of the vehicle, the length of the compression and extension strokes and also the length of the extension and compression stages in the spring damper unit remain unchanged.

Further embodiments of the invention and developments are disclosed in the subordinate claims, the description and the drawings.

It can be provided that the first adjusting device can be driven independently from the second adjusting device. This renders it possible, for example, in the case of a vehicle equipped with a spring damper unit of this type to control the level to compensate for the load without the ground clearance changing simultaneously (height adjustment).

It has proven to be of advantage if the adjusting devices can be mutually coupled in a drive-effective manner, i.e., if the adjusting devices can be mechanically or electromagnetically mutually coupled in such a manner that forces or torques can be transmitted. For example, the adjusting devices can be coupled in such a manner that the second adjusting device can only be driven together with the first adjusting device. Thus, for example, the first adjusting device can be driven by means of a drive unit, whereas the second adjusting device is driven indirectly by the drive unit via the first adjusting device. In the case of this embodiment, the first and the second adjusting device are allocated a common drive unit. Fundamentally, however, differently implemented embodiments are also feasible, where in each case a single drive unit is provided for the two adjusting mechanisms. Cost advantages are achieved by providing only one drive unit. In addition, this embodiment is characterized by its compactness.

It is possible to arrange a transmission device between the drive unit and at least one of the adjusting devices, which transmission device renders it possible to configure, i.e. to adjust or select, a drive-effective coupling between the drive unit and the relevant adjusting device. For example, the second adjusting device can be selectively coupled to the drive unit by means of the transmission unit.

Preferably, a locking device is allocated to the transmission device and said locking device renders it possible to fix at least one of the components of the transmission device relative to a housing of the spring damper unit. In particular, the locking device can be electrically driven (including electromagnetically), wherein the locking device is embodied in such a manner that in the case of a non-energized state the transmission unit is locked. This embodiment renders it possible, for example, to provide a "fail-safe" function, i.e. the transmission device is locked in the event of a malfunction in order to render it into a safe state in which, for example, the spring damper unit reacts as a non-active controllable spring damper unit.

In accordance with a particularly robust and compact embodiment of the transmission unit, said transmission unit comprises a planetary gear set. In particular, a sun gear of the planetary gear set is connected to an input element of one of the adjusting devices. In other words, the "output" of the planetary gear set is embodied by a sun gear, whereas the "input" of the planetary gear set is embodied, for example, by a ring gear of the planetary gear set. It goes without saying that in the case of other embodiments, a reverse arrangement can also be provided.

In specific cases, it can be of advantage if the first and the second adjusting device are each allocated a dedicated drive unit, which dedicated drive units are arranged, in particular, in a coaxial manner with respect to each other. A particularly compact structural shape is achieved if the two drive units are arranged at one end of the vibration damper, i.e. if they are both positioned in the region of one of the fastening devices. As a consequence, for example, the energy supply to the drive units is implemented in a simpler manner. In particular, a respective rotor of the two drive units can be connected directly to an input element of the corresponding adjusting device.

The aforementioned respective drive unit can comprise a rotor that is connected in a drive-effective manner directly to an input element of one of the adjusting devices, in particular an input element of the first adjusting device. As a consequence, the corresponding adjusting device is constantly driven during the operation of the drive unit.

It has proven to be of advantage if the drive unit is arranged in a coaxial manner with respect to one of the adjusting devices, in particular in a coaxial manner with respect to the two adjusting devices. Also, the first and the second adjusting device can be arranged in a coaxial manner with respect to each other, wherein this does not exclude the two adjusting devices being offset in the axial direction.

The two damper parts of the vibration damper that can move relatively with respect to one another can be a piston and a cylinder, wherein in particular the piston can be adjusted by means of the second adjusting device. The elastic element can be a spring, in particular a helical spring that is arranged between two spring plates, wherein the pre-stressing of the spring can be varied by displacing one of the two spring plates along a longitudinal axis, i.e. along the longitudinal extension of the spring damper unit.

The invention further relates to a method for damping relative movements between a first vehicle part and a second vehicle part and for controlling a spaced disposition between the two vehicle parts, in particular between a vehicle body and a wheel of a motor vehicle. The method comprises the use of a spring damper unit that is arranged between the vehicle parts and that comprises an elastic element and a vibration damper having two damper parts that can move relatively with respect to each other.

As mentioned in the introduction, known methods where either the elastic element or the damper component of the spring damper unit is influenced are encumbered by disadvantages that are reflected in a reduced travel comfort.

It is therefore a further object of the invention to provide a method that obviates these disadvantages.

This object is achieved by virtue of a method for damping relative movements between a first vehicle part and a second vehicle part and for controlling a spaced disposition between the two vehicle parts, in particular between a body and a wheel of a motor vehicle, said method using a spring damper unit that is arranged between the vehicle parts and that comprises the elastic element and a vibration damper having two damper parts that can move relatively with respect to each other, wherein it is possible to variably adjust the pre-stressing of the elastic elements by means of a first adjusting device, wherein at least one of the damper parts can be adjusted relative to one of the vehicle parts by means of a second adjusting device.

In accordance with the invention, the pre-stressing of the elastic element is variably adjusted by means of a first adjusting device. In addition, at least one of the damper parts is adjusted, if required, relative to one of the vehicle parts by means of a second adjusting device.

In accordance with an advantageous embodiment of the method, the adjusting devices are driven by a common drive unit.

It is possible to provide that the second adjusting device is driven in dependence upon the first adjusting device, in particular that the second adjusting device is only driven together with the first adjusting device.

In order, for example in the case of a vehicle, to control level to compensate for a load, it can be sufficient if only the first adjusting device is driven. As a consequence, a reduction in the spaced disposition of the vehicle parts is compensated for, which reduction is generated by means of a force, for example, a loading caused by an additional load—acting between the vehicle parts.

In addition, it can be provided that the first and the second adjusting device are driven in order to actively change the spaced disposition between the vehicle parts, in other words, for example, in order to raise or lower the vehicle body depending upon the road quality.

Advantageously, the second adjusting device is driven in such a manner that an adjusting movement is generated, which adjusting movement is in the opposite direction/anti-parallel to the adjusting movement generated by the first adjusting device. In particular, the second adjusting device is driven in such a manner that a relative movement, generated during the operation of the first adjusting device, between the two damper parts of the vibration damper is compensated for. This can be ensured, for example, by means of a corresponding coupling between the adjusting devices or also by virtue of a subsequent compensation by means of one of the two adjusting devices.

Further embodiments of the method are disclosed in the subordinate claims, the description and the drawings.

BRIEF DESCRIPTION OF THE DRAWINGS

The invention is explained hereinunder merely by way of example with reference to advantageous embodiments with the aid of the attached drawings, in which:

FIGS. 3 and 4 illustrate the cross-section of FIG. 2 in further operating states of the spring damper unit.

DETAILED DESCRIPTION OF EMBODIMENTS

Figure 1:
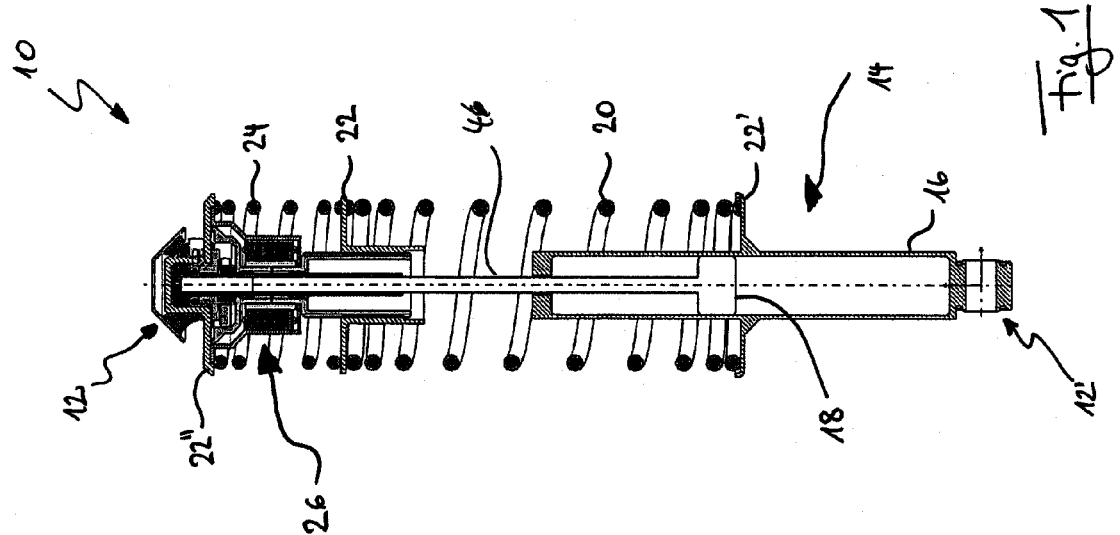
FIG. 1 illustrates a cross-sectional view of an embodiment of the spring damper unit in accordance with the invention.

FIG. 1 illustrates a spring damper unit 10 that comprises an upper fastening point 12 that can be connected to a body of a motor vehicle (not illustrated). A lower fastening point 12' is used to fasten the spring damper unit 10 to a wheel of the motor vehicle or to the allocated axle (not illustrated). The spring damper unit 10 comprises a shock absorber 14 having a cylinder 16 and a piston 18. The shock absorber 14 is used to damp vibrations between the wheel and the vehicle body. The shock absorber 14 is subjected to a compression force as the vehicle moves downward and is subjected to an extension force as the vehicle moves upward, as a result of which the damping procedure during the upwards movement is referred to as the 'extension stage' and during the downward movement is referred to as the 'compression stage'.

In addition, the spring damper unit 10 comprises a spring 20 that is arranged between a lower spring plate 22', which is fixedly connected to the cylinder 16, and a further upper spring plate 22. The upper spring plate 22 is also used as a lower supporting point for an additional, upper spring 24 whose upper fixing point is an upper spring plate 22" that is connected to the upper fastening point 12.

The spring plate 22 is arranged in a moveable manner and can be displaced along the longitudinal axis of the spring damper unit 10. For this purpose, actuating elements 26 are provided and said actuating elements are described in further detail hereinunder with reference to FIG. 2.

Figure 2:
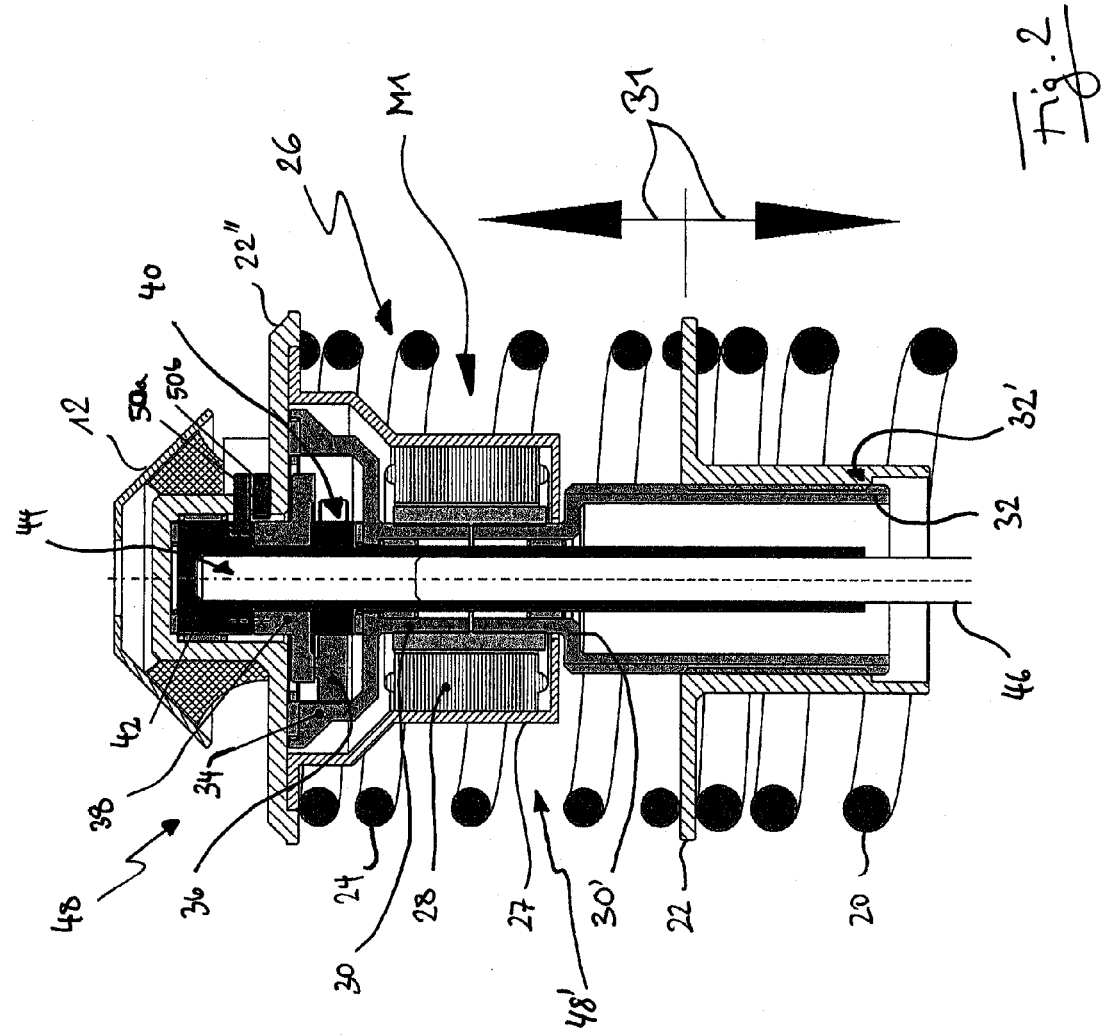
FIG. 2 illustrates an enlarged cross-section of the spring damper unit of FIG. 1.

FIG. 2 illustrates the upper region of the spring damper unit 10 in an enlarged view. As already described above, the spring damper unit 10 comprises the moveable spring plate 22 that forms an upper engagement site for the spring 20. An axial movement of the spring plate 22 changes the pre-stressing of the spring 20, as a consequence of which, for example, it is possible to perform a level compensation of the vehicle. In other words, if an increased additional loading of the vehicle causes the vehicle body to move towards the wheel, the spring plate 22 is actively moved downward relative to the upper fastening point 12. In other words, the upper fastening point 12 is, as a consequence, returned to the original "zero point position."

The already mentioned actuating elements 26 that are encompassed by a housing 27 are provided for the purpose of moving the spring plate 22. The actuating elements 26 comprise a motor M1 having a stator 28 and a rotor having a lower rotor section 30' and an upper rotor section 30. Although the two rotor sections 30, 30' are separate components to facilitate a simple assembly procedure, in an assembled state they are, however, mutually connected in a non-rotatable manner. The lower rotor section 30' encompasses a piston rod 46 of the piston 18 of the shock absorber 14 in a coaxial manner and comprises an external thread 32 that cooperates with an internal thread 32' of the spring plate 22 in order to move the (non-rotatable) spring plate 22 in an axial direction (spindle drive). In other words, the lower rotor section 30' is set in rotation by means of the stator 28 being energized, as a consequence of which the spring plate 22 is finally moved in an axial direction relative to the fastening point 12.

The upper rotor section 30 is connected to a ring gear 34 that meshes with planetary gears 36 (only one of which is illustrated). When the rotor section 30 is being driven by the stator 28, the ring gear 34 rotates and drives the planetary gears 36. The planetary gears 36 are supported on a planetary carrier 38 that is arranged in a coaxial manner with respect to a sun gear 40. The sun gear 40 is arranged in a non-rotatable manner on a piston rod housing 42. The piston rod housing 42 comprises a central bore 44 in which the piston rod 46 is arranged in a displaceable manner. The bore 44 comprises an internal thread that cooperates with a corresponding external thread of the piston rod 46 in order to form a spindle drive that enables the piston rod 46, and consequently the piston 18—to move relative to the actuating elements 26 and the components of the spring damper unit 10 that are fixedly connected to the actuating elements 26 (in particular relative to the fastening point 12).

In other words, the ring gear 34, the planetary gears 36, the planetary carrier 38 and the sun gear 40 form a planetary gear set that is arranged between the upper rotor section 30 of the motor M1 and the piston rod sleeve 42. Depending upon which component of the planetary gear set is fixedly attached to the housing, the torque can be transmitted from the motor M1 to the piston rod sleeve 42.

A change in position of the piston 18 relative to the cylinder 16 can be compensated for by moving the piston rod 46. As described in the introduction, in the case of a vehicle, for example, where the ground clearance has been increased by means of displacing the spring plate 22, as the vehicle body moves upward a stop of the piston 18 impacts earlier against the upper end of the cylinder 16 (extension stop) since the piston 18 has been displaced upward relative to the cylinder 16 by virtue of the height of the vehicle body having been adjusted. In order to compensate for this, the piston 18 is moved by virtue of a corresponding adjusting device 48, comprising the planetary gear set (ring gear 34, planetary gears 36, planetary carrier 38, sun gear 40) and the spindle drive (piston rod sleeve 42/piston rod 46) relative to the components that are fixedly attached to the vehicle body (relative, for example, to the actuating electronics 26, the upper spring plate 22" and the fastening point 12) and to the cylinder 16, in order to move back to a "zero point position" that provides sufficient stroke length both in the compression stage and also in the extension stage.

In order to be able to control the transmission of the torque from the motor M1 to the adjusting device 48 of the piston rod 46 and an adjusting device 48' of the movable spring plate 22, comprising the lower rotor section 30 and the corresponding spindle drive having the thread 32, 32', locking elements 50a, 50b are provided by means of which the sun gear 40 or the planetary carrier 38 of the planetary gear set of the adjusting device 48 can be secured in a non-rotatable manner as desired. The locking elements 50a, 50b can be actuated, for example, by means of a respective linear solenoid.

FIG. 2 illustrates a state in which the locking element 50a engages in a section of the piston rod sleeve 42 that is connected in a non-rotatable manner to the sun gear 40. Consequently, the sun gear 40 is secured in a non-rotatable manner, which is also indicated by the shading of the sun gear/piston rod sleeve combination. As the stator 28 is energized, on the one hand the lower rotor section 30' is set in rotation, as a consequence of which the movable spring plate 22 performs a translation movement that causes a change in the pre-stressing of the spring 20. The upper rotor section 30' is likewise set in rotation. However, since the sun gear 40 is fixedly attached, the planetary gears 36 roll along said sun gear and as a consequence finally set the planetary carrier 38 in rotation. However, this does not have any effect on the piston rod 46. Consequently, in the configuration illustrated, the operation of the motor M1 only causes the spring plate 22 to move. The movement of the spring plate 22—depending upon the rotational movement of the rotor section 30, is symbolized by the arrow B1.

FIG. 3 illustrates a different configuration. The locking element 50a no longer engages with the piston rod sleeve 42, whereas the locking element 50b now fixes the planetary carrier 38 in a non-rotatable manner (dark shaded area). In contrast to the configuration illustrated in FIG. 2, in this case during the operation of the motor M1, the planetary gears 36 are only driven in a rotational movement about their dedicated rotational axis. Since the planetary carrier 38 is now arranged in a non-rotatable manner, the sun gear 40 is rotated. This results in a displacement of the piston rod 46, symbolized by the arrow B2, said displacement being caused by the described spindle drive.

In the configuration illustrated in FIG. 3, the movement B1 already described in relation to the spring plate and in addition a piston rod movement B2 are generated, said movements being in the opposite direction, so that any change in the ground clearance of the vehicle does not lead to a reduction in the stroke length of the extension stage or compression stage of the shock absorber 14. In other words, the adjusting devices 48, 48' are mechanically mutually coupled in such a manner that compensation always occurs by means of performing a corresponding control in order to guarantee that the travel comfort remains unchanged.

FIG. 4 illustrates a configuration in which the two locking elements 50a, 50b engage into their allocated components 42 and 38 respectively and fix said allocated components. As a consequence, it is not only the adjusting device 48 that is locked. Since in this state, the upper rotor section 30 is no longer able to move, the lower rotor section 30' that is non-rotatably connected to the said upper rotor section can likewise no longer perform a rotational movement. This state consequently secures the spring damper unit 10. In so doing, the locking elements 50a, 50b are embodied in such a manner that in the event of a malfunction, for example, if there is no available electrical energy, a locking position is automatically assumed (all the components that are shaded in the illustration are secured in a non-rotational manner). Although it is consequently no longer possible to adjust the ground clearance and to perform a level compensation, the spring damper unit 10 is now located in a "fail-safe" state that fundamentally renders it possible to continue the drive in safety, even though the travel comfort may be reduced.

Figure 5:
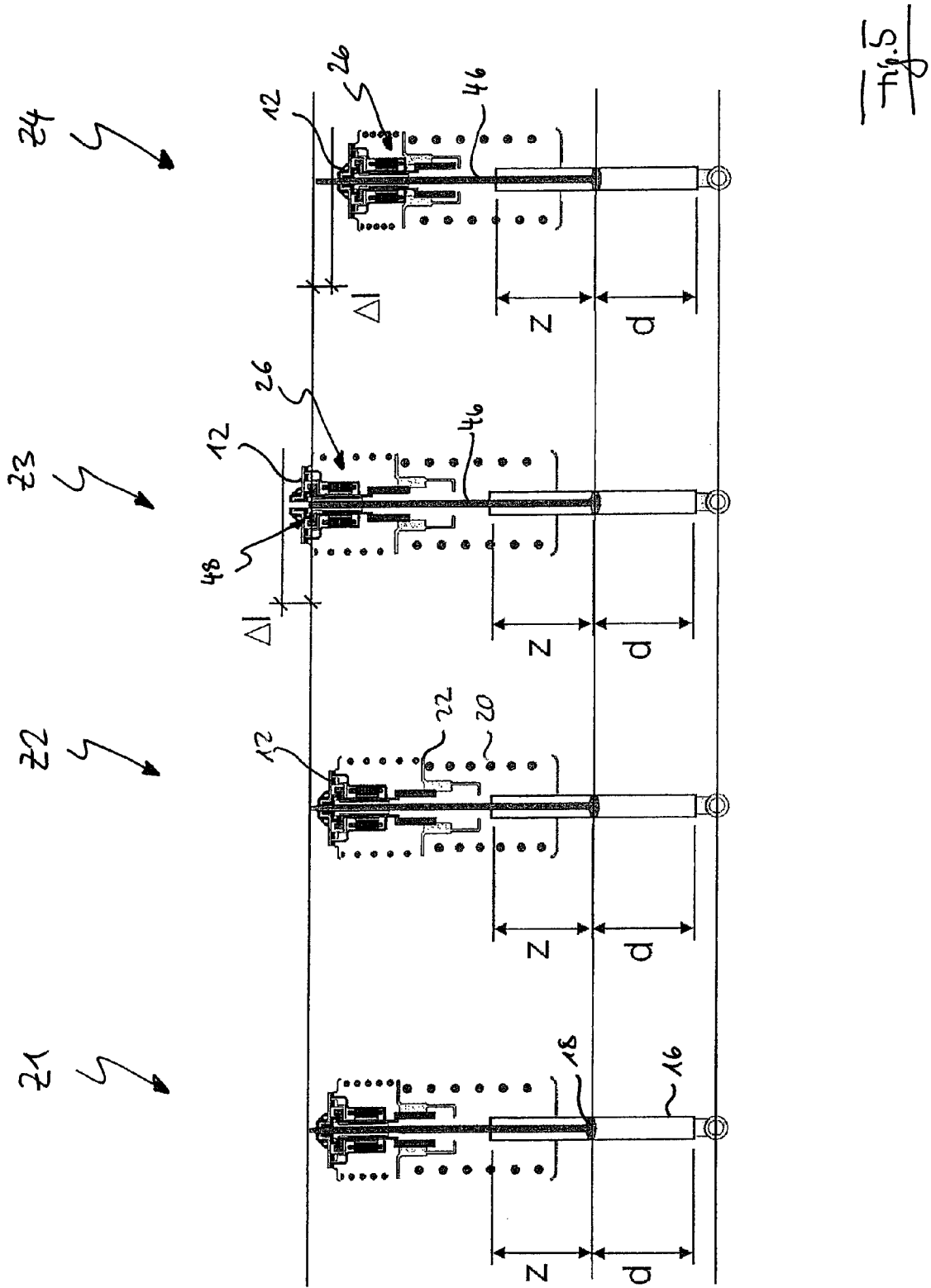
FIG. 5 illustrates a comparison of different operations conditions of the spring damper unit of FIG. 1.

FIG. 5 illustrates a comparison of the different operating states of the spring damper unit 10. State Z1 represents an unladen (normal) state. The piston 18 is almost in the middle of the cylinder 16, so that a stroke length z of the extension stage and a stroke length d of the compression stage are approximately of equal length.

The state Z2 prevails if the vehicle is laden. In order to perform a level compensation, the spring plate 22 has been moved downward relative to the upper fastening point 12 by means of the adjusting device 48'. The pre-stressing of the spring 20 has been increased. In so doing, the stroke lengths z, d remain unchanged.

The state Z3 illustrates the situation of an unladen vehicle that comprises an increased ground clearance, i.e. the vehicle body (upper fastening point 12) has been raised by an amount $\Delta 1$, for example, because the vehicle is to be used over rough terrain. It is clearly evident that, in order to maintain the stroke lengths z, d almost the same (compensation), the piston rod 46 has been moved downward relative to the actuating elements 26 and the upper fastening point 12 by means of the adjusting device 48. If the piston rod 46 had not moved, the piston 18 would be located in closer proximity to the upper end of the cylinder 16, as a consequence of which the stroke length z would be reduced and the stroke length d would be increased.

The state Z4 illustrates a reversal of the state Z3, i.e. the body of the vehicle has been lowered by the amount $\Delta 1$. The change of the relative position of the piston rod 46 with regard to the fastening point 12 and the actuating elements 26 is also evident in this connection.

Figure 6:
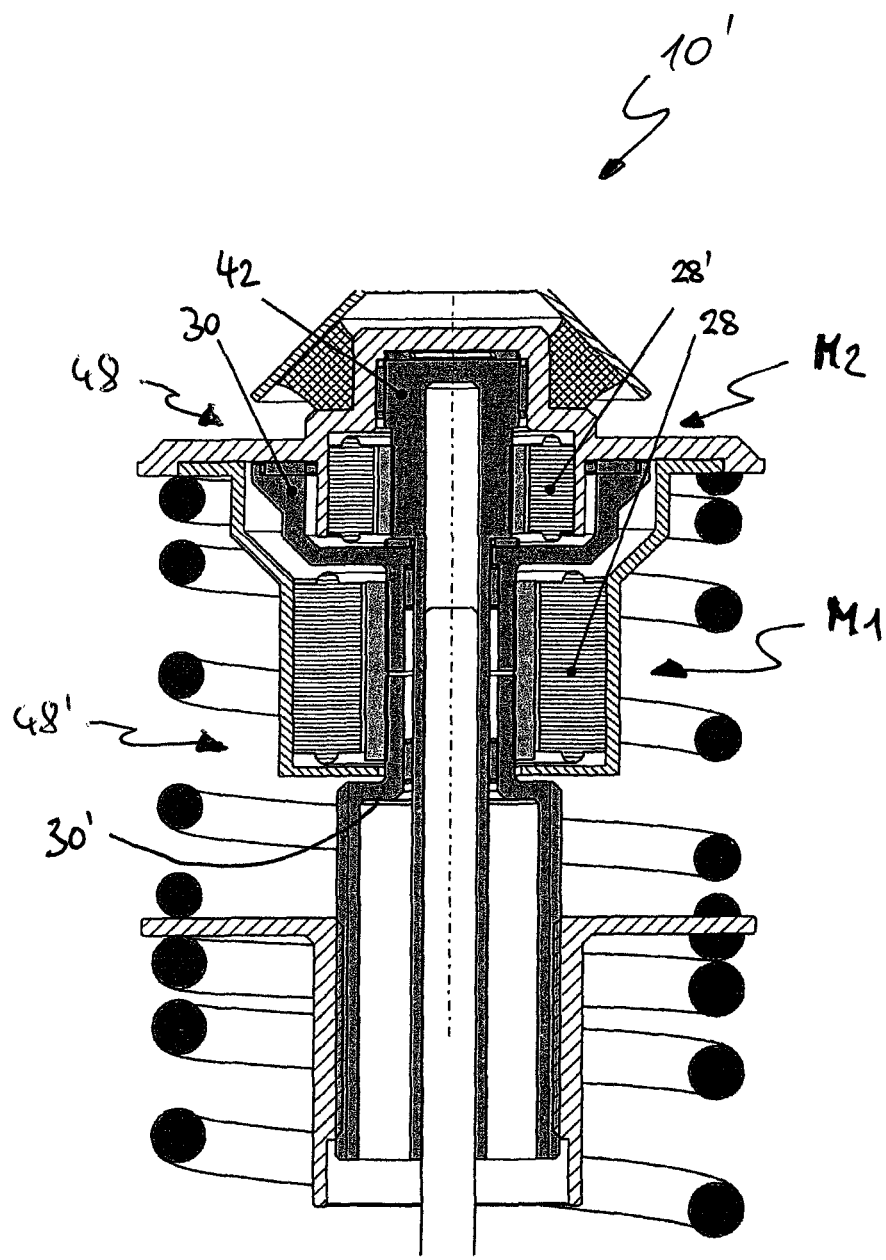
FIG. 6 illustrates a further embodiment of the spring damper unit in accordance with the invention.

FIG. 6 illustrates a further embodiment 10' of the spring damper unit, wherein the adjusting device 48 is not embodied in this case by a planetary gear set. The planetary gear set is replaced by a stator 28' that cooperates directly with the piston rod sleeve 42, which functions as a rotor, in order to form a motor M2. The upper rotor section 30 is no longer connected in a drive-effective manner to the piston rod sleeve 42, but is now used primarily to improve the mounting of the rotor (rotor sections 30, 30') of the motor M1. The motors M1, M2 of the adjusting devices 48' or 48 are arranged in a coaxial and adjacent/axially offset manner, so that their current supply can be arranged in a compact manner in the upper region of the spring damper unit 10'.

This embodiment renders it possible to actuate the adjusting devices 48, 48' independently, which is not possible in the case of the spring damper unit 10, where the adjusting device 48 can only be actuated together with the adjusting device 48'. A greater level of flexibility can be achieved in the case of the configuration of the spring damper unit 10' owing to the fact that the adjusting devices 48, 48' can be activated independently. The spring damper unit 10' also comprises suitable locking elements (not illustrated) in order to render it possible for the vehicle to be operated reliably even in the presence of malfunctions.

The spring damper units 10, 10' have been described above by way of example with regard to a motor vehicle, however, it goes without saying that the units 10, 10' can fundamentally also be used in other areas that place high demands on spring/damping devices.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE NUMERALS 10, 10' Spring damper unit
12, 12' Fastening point.
14 Shock absorber
16 Cylinder 18 Piston
20 Spring
22, 22', 22" Spring plate
24 Additional spring
26 Actuating elements
27 Housing
28, 28' Stator
30, 30' Rotor section
32, 32' Thread
34 Ring gear
36 Planetary gear
38 Planetary carrier
40 Sun gear
42 Piston rod t sleeve
44 Bore
46 Piston rod
48, 48' Adjusting device
50a, 50b Locking element
M1, M2 Motor
B1 Movement of spring plate
B2 Movement of piston rod
Z1, Z2, Z3, Z4 State
z, d Stroke length
Δ1 Amount

The invention claimed is:

1. A spring damper unit for a motor vehicle, the spring damper unit comprising:
a first fastening device to fasten the spring damper unit to the first vehicle part;
a second fastening device to fasten the spring damper unit to the second vehicle part;
an elastic element;
a vibration damper having a first vibration damper and a second vibration damper which move relatively with respect to each other and which are arranged between the first fastening device and the second fastening device to damp relative movements and control a spaced disposition between the first vehicle part and the second vehicle part;
a first adjusting device to variably adjust a pre-stressing of the elastic element;
a second adjusting device to adjust one of the first vibration damper and the second vibration damper relative to one of the first fastening device and the second fastening device;
a drive unit to drive the first adjusting device and the second adjusting device and which is arranged coaxially with respect to the first adjusting device and the second adjusting device; and
a transmission device arranged between the drive unit and at least one of the first adjusting device and the second adjusting device and which couples the drive unit and the at least one of the first adjusting device and the second adjusting device.

2. The spring damper unit of claim 1, wherein the first adjusting device and the second adjusting device are mutually coupled such that the second adjusting device is driven together only with the first adjusting device.

3. The spring damper unit of claim 1, further comprising a locking device to fix the transmission device relative to a housing of the spring damper unit.

4. The spring damper unit of claim 3, wherein the locking device is electrically driven such that when in a non-energized state the transmission device is locked.

5. The spring damper unit of claim 3, wherein the transmission device comprises a planetary gear set.

6. The spring damper unit of claim 5, wherein a sun gear of the planetary gear set is connected to an input element of one of the first adjusting device and the second adjusting device.

7. The spring damper unit of claim 1, wherein the first adjusting device and the second adjusting device are arranged coaxially with respect to each other.

8. The spring damper unit of claim 1, wherein:
the first vibration damper comprises a piston;
the second vibration damper comprises a cylinder; and
the piston is adjustable via the second adjusting device.

9. The spring damper unit of claim 1, wherein:
the elastic element comprises a spring arranged between a pair of spaced apart spring plates; and
the pre-stressing of the spring is variable by displacement of one of the spring plates along a longitudinal axis of the spring damper unit.

10. A spring damper unit for a motor vehicle, the spring damper unit comprising:
an elastic element;
a vibration damper having a first vibration damper and a second vibration damper which move relatively with respect to each other;
a first adjusting device which variably adjusts a pre-stressing of the elastic element;
a second adjusting device to adjust one of the first vibration damper and the second vibration damper relative to one of the first fastening device and the second fastening device;
a first motor to drive the first adjusting device, the first motor having a first stator and a first rotor section of a rotor; and
a second motor to drive the second adjusting device and which is arranged coaxially with respect to the first motor, the second motor having a second stator and a second rotor section of the rotor.

11. The spring damper unit of claim 10, further comprising:
a first fastening device to fasten the spring damper unit to a first vehicle part; and
a second fastening device to fasten the spring damper unit to a second vehicle part.

12. The spring damper unit of claim 11, wherein the first vibration damper and the second vibration damper are arranged between the first fastening device and the second fastening device to dampen relative movements and control a spaced disposition between the first vehicle part and the second vehicle part.

13. The spring damper unit of claim 10, wherein:
the first rotor section is directly connected to an input of the first adjusting device; and
the second rotor section is directly connected to an input of the second adjusting device.

14. The spring damper unit of claim 10, wherein the first adjusting device is driven independently of the second adjusting device.

15. A method of controlling a spaced disposition between a first vehicle part and a second vehicle part, the method comprising:
providing a spring damper unit between the first vehicle part and the second vehicle part, the damper unit including a first fastening device to fasten the spring damper unit to the first vehicle part, a second fastening device to fasten the spring damper unit to the second vehicle part, an elastic element, a vibration damper having a first vibration damper and a second vibration damper which move relatively with respect to each other and which are arranged between the first fastening device and the second fastening device, a first adjusting device, a second adjusting device, a drive unit arranged coaxially with respect to the first adjusting device and the second adjusting device, and a transmission device arranged between the drive unit and at least one of the first adjusting device and the second adjusting device;

variably adjusting, via the first adjusting device, a pre-stressing of the elastic element;

adjusting, via the second adjusting device, at least one of the first damper and the second damper relative to one of the first vehicle part and the second vehicle part;

driving, via the drive unit, the second adjusting device in such a manner that an adjusting movement is generated in an opposite direction to an adjusting movement generated by the first adjusting device; and driving, via the drive unit, the first adjusting device and the second adjusting device in order to change the spaced disposition between the first vehicle part and the second vehicle part.

16. The method of claim 15, wherein driving the second adjusting device comprises driving the second adjusting device together with the first adjusting device.

17. The method of claim 15, further comprising driving only the first adjusting device in order to compensate for a reduction in a spaced disposition between the first vehicle part and the second vehicle part created by a force acting between the first vehicle part and the second vehicle part.

18. The method of claim 15, further comprising driving, via the drive unit, the first adjusting device independently of the second adjusting device.

* * * * *